(12) United States Patent
Osmanis et al.

(10) Patent No.: US 11,782,290 B2
(45) Date of Patent: Oct. 10, 2023

(54) APPARATUS AND METHOD FOR DISPLAYING THREE-DIMENSIONAL IMAGE

(71) Applicant: Lightspace Group, Inc., Sunnyvale, CA (US)

(72) Inventors: Ilmars Osmanis, Mārupes novads (LV); Kriss Osmanis, Babītes nov. (LV); Roberts Zabels, Riga (LV); Martins Narels, Riga (LV); Ugis Gertners, Riga (LV); Sandra Balode, Ogres nov. (LV)

(73) Assignee: Lightspace Group, Inc., Sunnyvale, CA (US)

(*) Notice: Subject to any disclaimer, the term of this patent is extended or adjusted under 35 U.S.C. 154(b) by 0 days.

(21) Appl. No.: 17/326,405

(22) Filed: May 21, 2021

(65) Prior Publication Data
US 2022/0373819 A1    Nov. 24, 2022

(51) Int. Cl.
*G02B 30/52* (2020.01)
*G02B 27/01* (2006.01)

(52) U.S. Cl.
CPC ......... *G02B 30/52* (2020.01); *G02B 27/0101* (2013.01)

(58) Field of Classification Search
CPC .......... G02B 6/27; G02B 6/2726; G02B 6/34; G02B 6/3596; G02B 6/42; G02B 27/0101; G02B 2027/0112; G02B 2027/0127; G02B 30/52; G02B 30/00; G02B 30/50; G02B 6/0033; G02B 6/0036; G02B 6/0035; G02B 6/0051; G02B 6/0065

USPC .......................................................... 359/478
See application file for complete search history.

(56) References Cited

U.S. PATENT DOCUMENTS

| | | | |
|---|---|---|---|
| 11,243,338 B2* | 2/2022 | Lin ...................... | G02B 5/1871 |
| 2016/0231567 A1* | 8/2016 | Saarikko .............. | G02B 5/1866 |
| 2018/0052501 A1* | 2/2018 | Jones, Jr. ............. | G02B 5/1823 |
| 2019/0179149 A1* | 6/2019 | Curtis .................. | G02B 6/0076 |
| 2019/0227375 A1* | 7/2019 | Oh ......................... | G02B 6/12 |
| 2021/0173204 A1* | 6/2021 | Klug ................... | G02B 27/0075 |

* cited by examiner

*Primary Examiner* — Jade R Chwasz
(74) *Attorney, Agent, or Firm* — ZIEGLER IP LAW GROUP LLC

(57) ABSTRACT

An apparatus for displaying a three-dimensional image. The apparatus includes a light source, an intensity modulator to modulate an intensity of a given light beam, a mirror device to modulate spatially the intensity-modulated light beam at a given time instant, a first optics to collimate the spatially-modulated light beam and an image waveguide comprising an in-coupling structure to receive the collimated light beam and an out-coupling structure comprising out-coupling sites. The image waveguide directs the collimated light to the out-coupling structure which selectively redirects multiple reflections towards a segmented optical structure comprising at least two types of segments to redirect a first part of the multiple reflections to form a first type image point P1 at a first focal distance d1, d1' and a second part of the multiple reflections to form a second type image point P2 at a second focal distance d2, d2'.

15 Claims, 11 Drawing Sheets

APPARATUS AND METHOD FOR DISPLAYING THREE-DIMENSIONAL IMAGE

TECHNICAL FIELD

The present disclosure relates generally to display devices; and more specifically to an apparatus and a method for displaying three-dimensional image.

BACKGROUND

Presenting a three-dimensional image to the eyes of a viewer is a challenging task. When considering portable displays such as, head-worn displays or display systems with small footprint such as, automotive head-up displays, it becomes even more challenging to convey a truthful three-dimensional image with high image resolution and high image brightness for high contrast visibility and readability in brightly light environments especially in augmented reality displays.

Conventional, three-dimensional image with monocular focus cues may be generated by using several systems such as, light field displays and holographic displays. Typically, light field displays and holographic displays may be bulky and may require large processing power which may make them ill-suited for low-volume automotive head up display systems as well as lightweight head-worn displays. In contrast multifocal displays offer convenience in regards to image rendering and output without a demand for huge computational resources. Multifocal displays generally utilize rear image projector in conjunction with optics. One approach is utilization of varifocal lens element, another approach is utilization of reciprocating screen, yet another approach is utilization of electronically switchable light diffuser elements with high transparency. When any of the listed approach is considered in small form-factor display devices such as, head-worn displays or small-volume automotive head-up displays, miniaturization is a key factor. Generation of multiple focal planes puts a demand on very high refresh-rate image source such as, LCOS or DMD based micro projector. Unfortunately, such spatial light modulators have limitations in terms of physical footprint and corresponding image resolution/refresh rate. Also, power consumption is another main issue associated with reflective spatial light modulators. Hence, small volume units with high brightness and competitive image resolution may be still challenging.

Therefore, in light of the foregoing discussion, there exists a need to overcome the aforementioned drawbacks associated with conventional techniques for displaying the three-dimensional image.

SUMMARY

An object of the present disclosure is to provide an apparatus and a method for displaying a three-dimensional image. Another object of the present disclosure is to provide a solution that overcomes at least partially the problems encountered in the prior art.

In one aspect, an embodiment of the present disclosure provides an apparatus for displaying a three-dimensional image, the apparatus comprising
- a light source;
- an intensity modulator employed to modulate an intensity of a given light beam emanating from the light source;
- a mirror device employed to receive the intensity-modulated light beam and to modulate spatially the intensity-modulated light beam at a given time instant;
- a first optics employed to receive the spatially-modulated light beam and to collimate the spatially-modulated light beam;
- an image waveguide comprising
  - an in-coupling structure employed to receive the collimated light beam, wherein the collimated light beam corresponds to a given coordinate representing a two-dimensional image information at a given time instant,
  - an out-coupling structure comprising out-coupling sites, wherein the image waveguide is employed to direct the collimated light beam via total internal reflections within the image waveguide from the in-coupling structure to the out-coupling structure to form multiple reflections of the collimated light beam, and
  - wherein the out-coupling structure is employed to selectively redirect the multiple reflections via the outcoupling-sites towards a segmented optical structure, the multiple reflections representing a coordinate of a two-dimensional image;
- the segmented optical structure aligned with the out-coupling structure of the image waveguide, the segmented optical structure comprising segments corresponding to the outcoupling sites of the out-coupling structure,
- wherein the segments comprise at least two types of segments:
  - a first group of segments employed to redirect at least a first part of the multiple reflections to form a first type image point of the two-dimensional image at a first focal distance, and
  - a second group of segments employed to redirect at least a second part of the multiple reflections to form a second type image point of the two-dimensional image at a second focal distance.

In another aspect, an embodiment of the present disclosure provides a method for displaying a three-dimensional image, the method comprising
- modulating, via an intensity modulator, an intensity of a given light beam emanating from the light source, and directing the intensity-modulated light beam towards a mirror device;
- modulating spatially, via the mirror device, the intensity-modulated light beam at a given time instant, and directing the spatially-modulated light beam towards a collimator;
- collimating the spatially-modulated light beam via a first optics, and directing the collimated light beam towards an in-coupling structure of an image waveguide, wherein the collimated light beam corresponds to a given coordinate representing the two-dimensional image information;
- forming multiple reflections of the collimated light beam by undergoing total internal reflections inside the image waveguide of the collimated light beam;
- receiving multiple reflections of the collimated light beam in an out-coupling structure of the image waveguide, wherein the out-coupling structure comprises out-coupling sites;
- selectively redirecting the multiple reflections via the outcoupling-sites towards a segmented optical structure aligned with the out-coupling structure of the image waveguide, the multiple reflections representing a coordinate of a two-dimensional image, and wherein the segmented optical structure comprises at least two types of segments corresponding to the outcoupling sites of the out-coupling structure;

redirecting at least a first part of the multiple reflections by a first type of segments to form a first type image point of the two-dimensional image at a first focal distance; and redirecting at least a second part of the multiple reflections by a second type of segments to form a second type image point of the two-dimensional image at a second focal distance.

Embodiments of the present disclosure substantially eliminate or at least partially address the aforementioned problems in the prior art, and enable efficient display of the three-dimensional image.

Additional aspects, advantages, features and objects of the present disclosure will be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF DRAWINGS

Embodiments of the present disclosure will now be described, by way of example only, with reference to the following diagrams wherein.

DETAILED DESCRIPTION OF EMBODIMENTS

Figure 1:
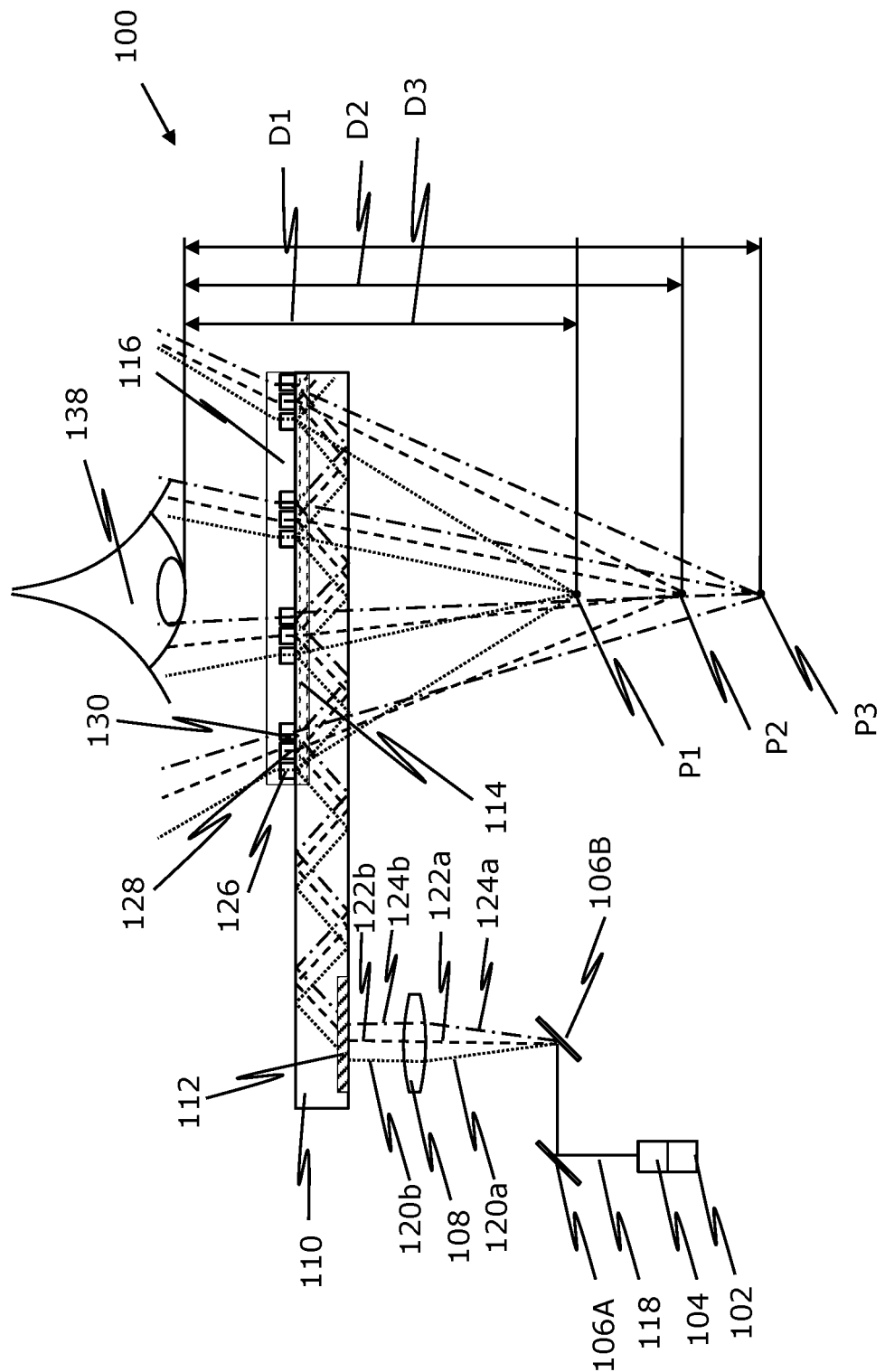
FIG. 1 is a schematic illustration of an apparatus for displaying a three-dimensional image, in accordance with an embodiment of the present disclosure.

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In one aspect, an embodiment of the present disclosure provides an apparatus for displaying a three-dimensional image, the apparatus comprising a light source;

an intensity modulator employed to modulate an intensity of a given light beam emanating from the light source;

a mirror device employed to receive the intensity-modulated light beam and to modulate spatially the intensity-modulated light beam at a given time instant;

a first optics employed to receive the spatially-modulated light beam and to collimate the spatially-modulated light beam;

an image waveguide comprising an in-coupling structure employed to receive the collimated light beam, wherein the collimated light beam corresponds to a given coordinate representing a two-dimensional image information at a given time instant, an out-coupling structure comprising out-coupling sites, wherein the image waveguide is employed to direct the collimated light beam via total internal reflections within the image waveguide from the in-coupling structure to the out-coupling structure to form multiple reflections of the collimated light beam, and wherein the out-coupling structure is employed to selectively redirect the multiple reflections via the outcoupling-sites towards a segmented optical structure, the multiple reflections representing a coordinate of a two-dimensional image;

the segmented optical structure aligned with the out-coupling structure of the image waveguide, the segmented optical structure comprising segments corresponding to the outcoupling sites of the out-coupling structure, wherein the segments comprise at least two types of segments:

a first group of segments employed to redirect at least a first part of the multiple reflections to form a first type image point of the two-dimensional image at a first focal distance, and a second group of segments employed to redirect at least a second part of the multiple reflections to form a second type image point of the two-dimensional image at a second focal distance.

In one aspect, an embodiment of the present disclosure provides a method for displaying a three-dimensional image, the method comprising modulating, via an intensity modulator, an intensity of a given light beam emanating from the light source, and directing the intensity-modulated light beam towards a mirror device;

modulating spatially, via the mirror device, the intensity-modulated light beam at a given time instant, and directing the spatially-modulated light beam towards a collimator;

collimating the spatially-modulated light beam via a first optics, and directing the collimated light beam towards an in-coupling structure of an image waveguide, wherein the collimated light beam corresponds to a given coordinate representing the two-dimensional image information;

forming multiple reflections of the collimated light beam by undergoing total internal reflections inside the image waveguide of the collimated light beam;

receiving multiple reflections of the collimated light beam in an out-coupling structure of the image waveguide, wherein the out-coupling structure comprises out-coupling sites;

selectively redirecting the multiple reflections via the outcoupling-sites towards a segmented optical structure aligned with the out-coupling structure of the image waveguide, the multiple reflections representing a coordinate of a two-dimensional image, and wherein the segmented optical structure comprises at least two types of segments corresponding to the outcoupling sites of the out-coupling structure;

redirecting at least a first part of the multiple reflections by a first type of segments to form a first type image point of the two-dimensional image at a first focal distance; and redirecting at least a second part of the multiple reflections by a second type of segments to form a second type image point of the two-dimensional image at a second focal distance.

The present disclosure relates to an apparatus for displaying a three-dimensional image. Throughout the present disclosure, the term "three-dimensional image" relates to an image that provides a perception of depth to a user. The three-dimensional image may be a volumetric image. Herein, the volumetric image may be an image having a height, a width, and a depth in the three-dimensional space. A given three-dimensional image could be a given volumetric image of at least one three-dimensional object (for example, such as a statue, a vehicle, a weapon, a musical instrument, an abstract design, and the like) or a three-dimensional scene (for example, such as a beach scene, a mountainous environment, an indoor environment, and the like). Moreover, the term "three-dimensional image" also encompasses a three-dimensional computer-generated surface. Furthermore, the term "three-dimensional image" also encompasses a three-dimensional point cloud. In an example, a sequence of three-dimensional images can relate to a three-dimensional video (such as a three-dimensional virtual game, a three-dimensional tutorial, and the like).

In order to display the three-dimensional image, the three-dimensional image may be divided into a plurality of image slices corresponding to the three-dimensional image to be displayed using the apparatus. The term "image slice" as used throughout the present disclosure, refers to each of a planar portion of a three-dimensional image. Such image slices of the object when put together enable the display of the three-dimensional image, such that a viewer can perceive the depth of the object displayed within the three-dimensional image. For example, the object to be displayed with the three-dimensional image is a spherical ball. In such an example, the image slices of the spherical ball correspond to a first set of circles, each having a bigger diameter than a preceding circle of the first set of circles and a second set of circles, each having a smaller diameter than a preceding circle of the second set of circles. Furthermore, the first set and the second set of circles are separated by a circle having a bigger diameter as compared to any circle within the first set or the second set of circles, such that the circle corresponds to a middle plane of the spherical ball. Moreover, when the image slices corresponding to the first set of circles, the circle having the biggest diameter and the second set of circles are arranged together and displayed to the viewer, the viewer perceives the depth associated with the spherical ball. Such a display of three-dimensional images using the image slices provides a convenient technique for enabling the viewer to perceive the depth of the object displayed within the image. Furthermore, such image slices reduce a necessity for altering the images (such as, for stereoscopic reconstruction of the images), thereby, maintaining a quality (such as, image resolution and/or sharpness) of the images. Moreover, displaying of the 3D image using the image slices reduces an amount of pre-processing of the images that is required to display the depth of the image (such as, for stereoscopic reconstruction of the images).

The present apparatus for displaying a three-dimensional image comprises a light source. As used herein, the term "light source" refers to any device that is capable of receiving an electrical signal and producing light in response to the signal. In general, the light source may be any device that emits a light beam. Herein, the light beam may carry information of the three-dimensional image to be displayed. Thus, the term "light source" should be understood to include light emitting diodes of all types, light emitting polymers, semiconductor dies that produce or emanate light in response to current, organic LEDs, electro-luminescent strips, and other such systems. In an example, the "light source" may refer to a single light emitting diode package including multiple semiconductor LED dies that are individually controlled.

In the present embodiments, the light source is a laser light source and the light beam is a laser light beam having a wavelength visible to human spectrum. That is, herein, the light source may emit the light beam by optical amplification of light by simulated emission of radiation with a wavelength corresponding to the spectrum visible human to the human eye. It may be noted that the light beam may contain multiple wavelengths to ensure full or true colour display of the three-dimensional image. The light beam may be modulated in its intensity and thus, may provide intensity values according to a corresponding image point of the three-dimensional image.

In the present examples, the laser beam systems are used in order to obtain high brightness. In general, laser sources convey bright image offering superior contrast even in sunlight. Typically, laser beam scanning is used for vector graphics. Nevertheless, in certain configurations it can be successfully applied for full-color raster image recreation. The peculiarity of laser beam scanners in one of near-to-eye display applications is that those are maxwellian type displays and form the image directly on a retina of the viewer, thus also known as retinal displays. Herein, the image has an extended depth of field (DOF) meaning it is substantially sharp or in focus irrespective of the refractive function or power of an eye. Thus, the eye may freely accommodate whilst receiving a sharp projected image. On one hand this may be considered a solution for overcoming a vergence-accommodation conflict in stereoscopic near-to-eye displays. Nevertheless, "always in focus" virtual image is not natural and doesn't produce natural retinal blur and realistic monocular focus cues. Moreover, when the laser beam scanning is employed as an image source, the resultant image is either shown at a single focal distance or is realized as retinal projection display with large depth of field. This results in absence of truthful focus depth cues, which may manifest as the vergence-accommodation conflict in stereoscopic systems or as a focal rivalry between the virtually conveyed content and a real-world scene that may potentially cause visual confusion. Consequently, in order to utilize benefits offered by laser light sources and versatile beam scanning by MEMS scanners, such display systems need modifications to support monocular focus cues.

Alternatively, laser beam scanning may be used in conjunction with, for example, a holographic image waveguide. In this case, it is quite easy to collimate the laser-beam formed image and guide it within the waveguide through in-coupling structure. When such image through an exit-pupil expanding waveguide is out-coupled towards the eyes of a viewer it maintains its collimation state or by application of secondary optics, a focal plane is offset from the infinity towards a closer distance. A limitation of such approach is the inability to convey focus cues accurately which gives rise to vergence-accommodation conflict and compromised performance at near-to-eye displays where the effect of vergence-accommodation mismatch manifests most.

The present apparatus comprises an intensity modulator employed to modulate an intensity of a given light beam emanating from the light source. It may be understood that the intensity modulator may electrically modulate light intensity, where it is modulated by means of current control of the laser diode generating the light beam. Herein, the intensity of the light beam may be modulated according to the corresponding image point. If the corresponding image point is too bright, the intensity of the light beam may be decreased. Similarly, if the corresponding image point is too dark, the intensity of the light beam may be increased by the intensity modulator. It may be noted that the intensity-modulated light beam may comprise one light ray for the corresponding image point.

The apparatus further comprises a mirror device employed to receive the intensity-modulated light beam and to modulate spatially the intensity-modulated light beam at a given time instant. That is, once, the given light beam is modulated in intensity, the intensity-modulated light beam may be sent over to the mirror device which in turn may modulate the intensity-modulated light beam spatially. Optionally, the mirror device is a micro-electromechanical mirror system. Herein, the micro-electromechanical system (MEMS) may constitute microscopic electrical and mechanical components. Micro-electromechanical mirror system constitutes microscopic mirrors whose states may be changed by application of voltage across its electrodes. Micro-electromechanical mirror system may be employed to spatially modulate the intensity-modulated light beam at the given time instant.

It may be appreciated that typically, raster images may be recreated by scanning laser beam along two axes. Herein, one of the axes may be a resonant axis. Herein, MEMS scanning with high frequency near its resonant frequency may be employed. And other axis may be a slow axis for expansion of image in another orthogonal direction. It may be common for resonant frequencies for the fast axis to surpass 100 kHz, while slow axis may be modulated typically, at low frequencies of several tens of hertz, for example, 50-120 Hz.

Optionally, the mirror device is further employed to modulate at least in a first axis and in a second axis. It may be noted that the mirror device may comprise two micro-electromechanical mirrors. They may be a first micro-electromechanical mirror and a second micro-electromechanical mirror. The intensity-modulated light beam may be directed towards the first micro-electromechanical mirror which may modulate the intensity-modulated light beam spatially in a first direction. Then, the intensity-modulated light beam may be directed towards the second micro-electromechanical mirror which may modulate the intensity-modulated light beam in a second direction that may be orthogonal to the first direction. The intensity-modulated light beam may be thus, spatially modulated and the spatially-modulated light beam may be obtained. Typically, the first micro-electromechanical mirror may be a fast mirror and the first direction may be a fast axis; and the second micro-electromechanical mirror may be a slow mirror and the second direction may be a slow axis. Herein, the first mirror may modulate light beam in the first direction with high frequency near its resonant frequency, and the second mirror may allow for the image expansion in the second direction (typically, orthogonal to the first direction).

Optionally, the mirror device comprises at least one of selected from two 1-dimensional mirrors or a 2-dimensional mirror. Such mirrors may implement Micro-Electro-Mechanical Systems (MEMS), as known in the art. It may be appreciated that the 1-dimensional mirrors may modulate the received intensity-modulated light beam in one axis, and thus it may be required to employ at least two such 1-dimensional mirrors to modulate the light along the said two axes; while a single 2-dimensional mirror may modulate the received intensity-modulated light beam in the said two axes, and thus only one such 2-dimensional mirror may be required. It may be appreciated that the said one or two dimensions corresponds to the modulation degrees of freedom, and as such are attributed to the configuration of MEMS device and not, particularly, the mirror itself.

The apparatus further comprises a first optics employed to receive the spatially-modulated light beam and to collimate the spatially-modulated light beam. Herein, the first optics may receive the spatially-modulated light and may collimate it to produce a collimated light beam. Such collimated light beam may comprise parallel light rays and hence, may scatter less as compared to directly using the spatially-modulated light beam which is uncollimated; which in turn may enhance the quality of generated three-dimensional image. Optionally, the first optics is a collimator. The term "collimator" is here used in its broadest sense for a beam-guiding or beam-shaping element.

The apparatus further comprises an image waveguide. It may be appreciated that the image waveguide may be a structure that may allow transmission of light rays through it in one direction with minimum loss. Herein, the collimated light beam from the first optics is received in the image waveguide. It may be noted that, as the collimated light beam are received within the image waveguide, the light beams may propagate through the image waveguide via total internal reflections.

The image waveguide comprises an in-coupling structure employed to receive the collimated light beam, wherein the collimated light beam corresponds to a given coordinate representing a two-dimensional image information at a given time instant. In the present system, the collimated light beam may be directed into the image waveguide via the in-coupling structure. The in-coupling structure may be any one of a volume hologram, a surface diffractive grating or a meta surface. The in-coupling structure may rely on simple principles of geometrical optics. In an embodiment, the in-coupling structure may be a prism. The in-coupling structure may be a pattern surface or thin-film covering a certain region of a waveguide's surface. Each of the light rays of the collimated light beam which is spatially separated is received by the in-coupling structure.

The image waveguide further comprises an out-coupling structure comprising out-coupling sites. Similar to the in-coupling structure, the out-coupling structure can be any of the volume hologram, the surface diffractive grating, the meta surface or an array of microprisms. The out-coupling structure may be a pattern surface or thin-film covering a certain region of a waveguide's surface. Once the collimated light beam reaches the out-coupling structure, they may be at least partially extracted from the image waveguide.

The out-coupling structure is employed to selectively redirect the multiple reflections via the outcoupling-sites towards a segmented optical structure, the multiple reflections representing a coordinate of a two-dimensional image. The segmented optical structure may act as lens element and may deflect corresponding collimated light beam in certain way so as to bring the corresponding virtual image planes closer than infinity. As discussed, the collimated light beam propagates through the image waveguide by total internal reflections. As the collimated light beam is reflected from the out-coupling structure, a part of its intensity is outcoupled and redirected towards the segmented optical structure. Rest of the intensity of the multiple reflections propagates through the image waveguide. That is, one part of intensity of the collimated light beam may be outcoupled at a first outcoupling-site while a remaining part may travel further down the image waveguide and may be outcoupled at an another outcoupling-site, as the multiple reflections hit the out-coupling structure. It may be noted that, the collimated light beam when entering the image waveguide as well as when exiting may be spatially modulated.

It may be appreciated that the grating itself would be uniform, and the outcoupling sites only correspond to geometrical positions in which actually each reflection is outcoupled so to better associate it with segmented second optics. In the present examples, the out-coupling structure is employed to ensure substantially equal intensity of the redirected multiple of reflections. The out-coupling structure may be tailored to ensure such substantially equal light intensity for all outcoupled light beam. For instance, if the out-coupler is a diffractive grating, it is characterized by its efficiency, i.e. how much light is diffracted and how much can carry on. Therefore, the diffraction effectivity can be tuned gradually or semi-gradually. For example, at beginning 100% of light rays hit the first site, and let's say 10% are diffracted out (in relation to incident light). Then 90% travel to the next site, where: a) If the grating is not gradually tuned, again 10% of those 90% will be diffracted out of the waveguide. Nevertheless, in such case at the second site, the diffracted intensity would be lower in comparison to the first site—making the diffracted light dimmer. b) If the grating is tuned properly, the diffraction efficiency will be increased, and the outcoupling intensity at this site will match that of 10% of 100%; but to achieve this intensity, the diffraction efficiency has to be increased to 11.1% because only 90% are reaching the second site. Physically, if we consider depth of the grooves of a diffraction grating, the deeper the grooves the more efficient is the diffraction grating. Thus, to achieve substantially equal intensity of the redirected multiple of reflections one of the possibilities would be to change the groove depth gradually across the direction of light propagation. For volume holograms, diffraction efficiency may be proportional to difference in the refractive index of the grating, thus this difference could also be gradually varied to achieve the said purpose.

Optionally, at least one of the in-coupling structure and the out-coupling structure is selected to be at least one of a diffractive optical element, a holographic optical element, a metasurface, an array of microprisms, a volume holographic optical element, a surface diffractive grating, an array of microprisms, a structure with at least one prism element. It may be appreciated that the diffractive optical element may be an optical element comprising components of dimension similar to wavelength. Such diffractive optical element works on a phenomenon of diffraction. The holographic optical element may be an optical element that works on the phenomenon of diffraction and has high diffraction efficiency. Such holographic optical element may be used in transparent displays. The metasurface may be a thin nanostructured artificial optical element. The array of microprism may comprise a plurality of micro polygonal transparent optical elements that may help in bending of light rays passing through it. The surface diffractive grating may split and diffract light rays incident on its surface. As discussed, at least one of the in-coupling structure and the out-coupling structure may be selected to be at least one of the diffractive optical element, the holographic optical element, the metasurface, the array of microprisms, the volume holographic optical element, the surface diffractive grating, the array of microprisms, the structure with at least one prism element.

Optionally, the segmented optical structure is selected to be at least one of a diffractive optical element, a holographic optical element, a metasurface, an array of microprisms, a volume holographic optical element, an active metasurface lens element, a microlens array. The segmented optical structure may be, for example, the volume holographic element, the diffractive optical element, the metasurface optical, the microlens array which may be an active metasurface lens element such as, electrically switchable liquid crystals. Furthermore, segmented optical structure may be tuned to work with specific wavelengths of the light source, thus minimally interfering with a real-world scene. Alternatively, the functionality of the segmented optical structure may be embedded within the out-coupling structure. Thus, in effect, the described optical configuration allows for a multi-focal image generation.

The segmented optical structure is aligned with the out-coupling structure of the image waveguide. The segmented optical structure comprises segments corresponding to the outcoupling sites of the out-coupling structure. As discussed, the out-coupling structure may be a pattern surface or thin-film covering a certain region of a waveguide's surface. In particular, if the out-coupling structure is a surface grating, then the waveguide has a patterned region; and if the out-coupling structure is a volume hologram, then the out-coupling structure may be a thin layer of some other patterned material. The out-coupling structure may be employed to selectively redirect the multiple reflections via the outcoupling-sites towards the segmented optical structure. The segmented optical structure may be aligned with the out-coupling structure. In an example, the segmented optical structure may be positioned on a portion of a top of the out-coupling structure. In an embodiment, the segmented optical structure may comprise a plurality of segments. As the multiple reflections are redirected towards the segments, some portion of the intensity may be outcoupled. Hence, the position of segments corresponds to the out-coupling sites.

As discussed, the three-dimensional image may be displayed by first slicing the three-dimensional image into at least two two-dimensional image slices. A first two-dimensional image slice may be rendered on to a display positioned at a first focal distance and a second two-dimensional image slice may be rendered on to the display positioned at a second focal distance. Each of the two-dimensional image slices may comprise a plurality of image points. Each image point may correspond to a pixel and may have a pixel value.

The segments comprise at least two groups of segments: a first group of segments employed to redirect at least a first part of the multiple reflections to form a first type image point of the two-dimensional image at a first focal distance and a second group of segments employed to redirect at least a second part of the multiple reflections to form a second type image point of the two-dimensional image at a second focal distance. The first group of segments and the second group of segments may be discrete, gradient or combined in nature. The first group of segments and the second group of segments of the segmented optical structure may correspond to the outcoupling-sites of the respective multiple reflections. Herein, the first focal distance may be smaller than the second focal distance and may be closer to a viewer's eye, and the second focal distance may be greater than the first focal distance and may be farther from the viewer's eyes. The first group of segments may redirect at least the first part of the multiple reflections to form a first type image point at the first focal distance. Herein, the first type image point may be one image point of the first two-dimensional image slice. The second group of segments may redirect at least the second part of the multiple reflections to form a second type image point of the two-dimensional image at the second focal distance. Herein, the second type image point may be one image point of the second two-dimensional image slice. Since, the first type image point and the second type image point are formed at different distances from the viewer's eyes, they give the perception of depth to the viewer. It may be noted that in order to get the perception of depth better, the three-dimensional image may be sliced into more than two slices.

Optionally, the apparatus further comprises a third group of segments employed to redirect at least a third part of the multiple reflections to form a third type image point of the two-dimensional image at a third focal distance. Herein, the third focal distance may be greater than the first focal distance and the second focal distance. Hence, the third focal distance may be farthest from the viewer's eyes. The third type segment may redirect at least part of the third part of the multiple reflections to form a third type image point. The third type image point may be the image point of the two-dimensional image to be displayed at the third focal distance.

In an implementation, the three-dimensional image may be sliced into three image slices. There may be three focal planes to provide the perception of depth to the viewer. A first focal plane may be at the first focal distance d1, a second focal plane may be at the second focal distance d2, and a third focal plane may be at the third focal distance d3. The first focal distance may be smallest, the second focal distance may be greater than the first focal distance but less than the third focal distance and the third focal distance may be greater than the second focal distance. The first type image point, say, P1 may belong to the first focal plane which is closest to the viewer. A resolution of the two-dimensional image displayed on the first focal plane may be R1. The second type image point, say, P2 may belong to the second focal plane which may be in a middle of the first focal plane and the third focal plane. The resolution of the two-dimensional image displayed on the second focal plane may be R2. Similarly, a third type image point, say, P3 belongs to the third focal plane which may be farthest from the viewer. The resolution of the two-dimensional image displayed on farthest focal plane may be R3. In one of the embodiments, resolutions of all the three focal planes R1, R2 and R3 may be substantially similar or equal. That is, R1 may be equal to R2 which in turn may be equal to R3. In alternative embodiment, the resolutions R1, R2, R3 may not be equal.

It may be appreciated that benefits of a multifocal architecture may be experienced at close image rendering distances. Thus, it may be understood that a closest focal plane may have to convey the highest details while compromised resolutions may be allowed for furthest focal planes which typically, may convey information associated to distant objects. In case, an intended application of such near-to-eye display is predominantly near-work, a division among resolution for different focal planes may shift most of the image points to near focal planes such as, the closest focal plane and a middle focal plane in case of a total of three focal planes.

Optionally, the segmented optical structure comprises at least one of selected from a passive transparent optics or an active transparent optics. In an embodiment, the segmented optical structure comprises the passive transparent optics. The passive transparent optics provide a fixed mode of operation. Herein, the focal distances are fixed and may not be varied. As discussed, in an implementation, the three-dimensional image may be sliced into three image slices. There may be three focal planes to provide the perception of depth to the viewer. The first focal plane having resolution of R1 may be at the first focal distance d1, and be the closest focal plane to the viewer's eye. The second focal plane having the resolution of R2 may be at the second focal distance and may be the middle focal plane. The third focal plane having the resolution of R3 may be at the third focal distance and may be the farthest focal plane to the viewer's eye. Herein, in an embodiment, R1 may be greater than R2 and R2 may be equal to R3. In another embodiment, R1 may be greater than R2 and R2 may be greater than R3. In yet another embodiment, R1=R2 and R1 and R2 may be less than R3. In other words, the resolution or a total pixel count of the two-dimensional image attributed to the closest focal plane may be largest as the closest focal plane requires larger details of the two-dimensional image displayed on it when conveying the three-dimensional image to the eyes of the viewer. Furthermore, the "middle" focal plane may have equal or smaller resolution than the closest focal plane, while the farthest focal plane may be configured to have the lowest resolution amongst all the three focal planes. Such configuration of image resolution or assignment of limited amount of image points or pixels to corresponding focal planes is associated with the most probable content that needs to be depicted. It must be noted that the described case of three focal planes is an example only and the present disclosure shall not be limited to only three focal planes. That is, a higher or lower number of focal planes may be realized similarly without any departure from the spirit and the scope of the present disclosure.

In another implementation, the segmented optical structure comprises an active transparent optics. The active transparent optics provides an adaptive mode of operation. Herein, the segmented optical structure may be tuned at least in groups in real-time between at least two discrete states. Herein, the active transparent optics may comprise liquid crystal based micro-lenses, liquid crystal based metasurface structures and similar compound optical elements utilizing controllable anisotropic properties of optical materials. Such configuration provides an opportunity for implementation of adaptive content analysis and image output.

In an embodiment, the segments of the segmented optical structure may be configured to effectively represent double the number of focal planes. That is, corresponding segments of segmented optical structure may be configured to allocate the first type image point, say, P1 to the first focal distances which may take values as d1 or d1' at the given time instant, the second type image point, say, P2 to the second focal distances which may take values as d2 or d2' at the given time instant and the third type image point, say, P3 to the third focal distances which may take values as d3 or d3' at the given time instant. Furthermore, the image resolution for the first focal distance, the second focal distance and the third focal distance may be R1, R2 and R3, respectively, whereas, a corresponding total pixel count may be C1, C2 and C3, respectively. In an embodiment, the focal distances chosen may comply with a rule of d1<d1'<d2<d2'<d3<d3'. Thus, the two-dimensional images displayed may be configured to better correspond to the three-dimensional image. That is, when the three-dimensional image is output to the active transparent optics having multiple switchable focal planes, the active transparent optics may be configured to display the three-dimensional image in the best way by minimizing disparities between vergence and accommodation. For example, in a first moment of time the three-dimensional image displayed may be a three-dimensional sphere located near the viewer, while in a second moment of time, the three-dimensional sphere has moved further away from the viewer and it may be displayed at different depth. For the three-dimensional image of the first moment of time one set of focal planes with corresponding focal distances may be chosen, while in the second moment of time a different set of focal planes with corresponding different focal distances may be better suited.

In an embodiment, the total pixel count may be C1, C2 and C3 for the first focal distance, the second focal distance and the third focal distance, respectively, such that C1 is greater than C2 and C2 is greater than C3. In another embodiment, C1 is greater than C2 and C2 is equal to C3. That is, potential focal planes may have differing total image point count and the respective resolutions may also differ accordingly. As the three-dimensional image may be predominantly output at close focal distances, it may be beneficial to allocate a higher total count of pixels to the closest focal plane situated at the closest focal distance while further focal planes may be represented by a lower total count of pixels.

As discussed, the segmented optical structure may be configured to effectively represent double the number of focal planes as explained above. In an embodiment, the first type image point, say, P1 may be allocated to the first focal distances which may take values as d1 or d1' at the given time instant, the second type image point, say, P2 may be allocated to the second focal distances which may take values as d2 or d2' at the given time instant, and the third type image point, say, P3 may be allocated to the third focal distances which may take values as d3 or d3' at the given time instant. Furthermore, the image resolution for the first focal distance, the second focal distance and the third focal distance may be R1, R2 and R3, respectively, whereas, a corresponding total pixel count may be C1, C2 and C3, respectively. In this case, the image quality may be optimized by taking d1 less than d1', d2 less than d2', d3 greater than d3', d1' equal to d3, d2' equal to d3 and d3' equal to d2. Essentially this means that a first set of image points corresponding to the first focal distance d1 may be switched to the farthest possible focal distance corresponding to the third focal distance d3 as d1' is equal to d3, while a second and a third set of image points may share similar focal distances. Such configuration is optimum for near content and may also represent far content with similar image quality. Herein, as C1 is greater than C2 which is greater than C3, or C1 is greater C2 and C2 is equal to C3, the image points of the first and second image point sets may be merged with the third set of image points for virtually enabling full resolution at the farthest focal distance which may the third focal distance. This is useful for depicting a far-only content with maximum image quality. In case, all the focal planes are represented, the image points of the three-dimensional image may be distributed accordingly. Nevertheless, as in the presence of near content, likely an attention of the viewer will be fixated on it. Hence, a chosen unequal image point distribution among focal planes may be beneficial as the near content will be represented with a higher relative image point density, whereas image point density will be reduced for the middle and the farthest focal planes. In contrast, if the content is predominantly depicted in near-space, the image points attributed to the third image point set may be allocated to the middle focal plane.

It may be noted that irrespective of whether the segmented optical structure comprises the passive transparent optics or the active transparent optics, groups of image points may be created for different focal distances. An arrangement of the groups of image points created for different focal distances may be tailored differently. In an example, a first group of image points may be defined for the first focal distance, a second group of image points may be defined for the second focal distance and a third group of image points may be defined for the third focal distance. Herein, in an embodiment, the number of image points defined for each group may be equal. In an alternative embodiment, the number of image points defined for each group may be unequal. The allocation of the image points to each group may be anisotropic. For example, the image points of the first group, which typically would correspond to the nearest focal distance, may be located more towards a centre of the three-dimensional image so as to have the higher image point density at the centre, while image points of the second group and the third group, in contrast may have the higher relative image point density on a periphery. Such arrangement of image points may be attributed to a most probable content. Typically, at close focal distances, the content that may be in the centre of a visual field and on which the attention of the viewer may be fixated is better represented to with the higher image point density, while content in far-field may occupy a peripheral view with higher probability.

It may be noted, that in an embodiment the segments of the segmented optical structure comprising the active transparent optics may be addressed collectively per group. That is, all segments corresponding to the first group of image points may be switched between at least two discrete states substantially simultaneously. Similarly, all segments corresponding to the second and the third group of image points may be also switched between the two discrete states substantially simultaneously. That is, within a hardware of the apparatus there may be a register utilizing, for example, three bits, which represent each group of image points. Two values of each bit may correspond to the chosen discrete state, which may be activated through, for example, a voltage control executed by a dedicated control logic/driver unit. It may be understood, that alternatively, the apparatus may perform with better accuracy, if the segments of the segmented optical structure comprising the active transparent optics is addressed individually. Nevertheless, similar principles may be applicable for an embodiment which allows per-segment addressing of the segmented optical structure.

In order to implement the active transparent optics in the segmented optical structure, first a data from positional sensors, including inertial motion unit may be obtained by a master application, which in turn may feed instructions to a graphics processing unit to imitate rendering of the three-dimensional image. Based on available focal distances, a first-pass images with similar threshold values based on pixel depth values of a depth map may be rendered. Preferably, the rendered first-pass images may be of higher resolution, at least two to four times higher than a second-pass image, resolution of which would correspond to the resolution of a hardware of the image source. Subsequently, a filtering process may be implemented. The filtering process may analyse a total number and values of image points rendered per focal plane. The values and number of image points may be compared against a said threshold value. If the given focal plane doesn't contain total number of image points that are outside threshold limits, the given focal plane may be considered "empty". Based on pixel depth values, below threshold pixels may be allocated to respective next closest focal planes. Optionally, some pixels, for example, extremely dark pixels may be discarded based on their value. Empty image points of the corresponding focal planes may be allocated to image points of other possible focal plane, allowing its representation in the final three-dimensional image with higher count of image points. Next, the second-pass process of remapping pixels form the focal planes to the second-pass image with reduced resolution, which corresponds to resolution of the image source. In the present examples, a process of remapping, such as, Voronoi cell principle may be applied, which is well known in the art and thus not described herein for the brevity of the present disclosure. It may be understood that if there is an empty focal plane, a Voronoi cell centre pattern may become different by merging available image points.

It may be further noted that, information of configuration for the segmented optical structure comprising the active transparent optics may be encoded in least significant bits of a first image point. This may be done, to alleviate synchronization between a video signal and operation of the segmented optical structure. Herein, the configuration of the segmented optical structure for a given three-dimensional image frame may be always sent beforehand in order to allow time to configure the segmented optical structure accordingly and to output graphical data with least possible latency as it is transferred to the apparatus.

The steps for displaying the three-dimensional image for the segmented optical structure comprising the passive transparent optics may be similar to steps for the segmented optical structure comprising the active transparent optics. Herein, first the data from sensors, such as positional data, acceleration data, tilt data and the like may be collected by the master application, which then provides rendering instructions for the graphics processing unit. Based on the received data, the three-dimensional image may be rendered by segmenting the three-dimensional image according to available physical focal distances. That is, based on the focal planes, the rendered image points may be assigned to groups corresponding to the first focal distance, the second focal distance and the third focal distance. The thresholds for assigning the image point to the given focal distance may be typically chosen to minimize vergence-accommodation disparity. That is, the whole three-dimensional image may be divided into three regions each corresponding to the given focal plane. If the rendered image point based on its depth value falls within a first region, it may be assigned to the first focal plane, if the image point falls into a second region it may assigned to the second focal plane and if the image point falls into a third region it may be assigned to the third focal plane. In case of three focal planes, the boundaries of regions may be determined based on locations of the focal planes in diopter space. The boundaries of the third region corresponding to the farthest focal plane which is the third focal plane may be determined from infinity in the diopter space to the half distance between the third and the second focal plane in the diopter space. The boundaries for the second region corresponding to the middle focal plane which is the second plane may be determined from the half distance between the third and the second focal planes in the diopter space to a half distance between the second and first focal planes in the diopter space. The boundaries for the first region corresponding to the nearest focal plane which is the first focal plane may correspond from a half distance from between the second and the first focal planes to zero in diopter space. The resolution of rendered images, in the given example, would correspond to three two-dimensional images each representing given focal plane and may coincide with the resolution of the image source on the display device. Alternatively, this resolution of rendered image is higher than the resolution of the image source. This is considered as the first pass. In order to perform remapping of image points efficiently preferably the resolution of the first-pass images may be higher than the resolution of the image source of the display device. Preferably the resolution may be at least two to four times higher than that of the image source. That is, in the first-pass step, a sampling step may be higher than in the image of the second-pass. As first-pass high-resolution images have been obtained and stored in a memory of the graphics processing unit, the second-pass process may remap pixels from three high resolution images onto a one final image frame whose resolution may correspond to the resolution of the image source.

Once, the image points from the perspective of the viewer split among different focal planes, the remapping procedure may have to capture most details in order to effectively convey three reduced resolution images representing three focal planes. As for some focal planes, the image points may be sparsely and possibly anisotropically distributed, the first-pass images which is of higher resolution may provide better and more precise output result. The remapping of first-pass image onto a low-resolution compound image, which is the second-pass image encompasses utilization of the Voronoi cell division (as explained in the preceding paragraphs). That is, the centres of the Voronoi cell division correspond to centres of the image point groups distinguished within the low-resolution final image. Based on these cells, a division grid may be created and overlaid on the first-pass image. Consequently, the image falling within the given Voronoi cell may be mapped onto corresponding pixel within the second-pass image. It may be noted, that depending on the given arrangement of image points of certain group within the second-pass image, the mapping procedure may include additional computation. For example, if the density of given image points within the centre is higher than in the periphery, the values of mapped pixels may be adjusted accordingly to facilitate uniform perceived brightness in accordance to the content. That is, a compensation for unequally spaced image points may be introduced.

The present description also relates to the method for displaying the three-dimensional image as described above. The various embodiments and variants disclosed above apply mutatis mutandis to the method for displaying the three-dimensional image. The method comprises modulating, via an intensity modulator, an intensity of a given light beam emanating from the light source, and directing the intensity-modulated light beam towards a mirror device. The method further comprises modulating spatially, via the mirror device, the intensity-modulated light beam at a given time instant, and directing the spatially-modulated light beam towards a collimator. The method further comprises collimating the spatially-modulated light beam via a first optics, and directing the collimated light beam towards an in-coupling structure of an image waveguide, wherein the collimated light beam corresponds to a given coordinate representing the two-dimensional image information. The method further comprises forming multiple reflections of the collimated light beam by undergoing total internal reflections inside the image waveguide of the collimated light beam. The method further comprises receiving multiple reflections of the collimated light beam in an out-coupling structure of the image waveguide, wherein the out-coupling structure comprises out-coupling sites. The method further comprises selectively redirecting the multiple reflections via the outcoupling-sites towards a segmented optical structure aligned with the out-coupling structure of the image waveguide, the multiple reflections representing a coordinate of a two-dimensional image, and wherein the segmented optical structure comprises at least two groups of segments corresponding to the outcoupling sites of the out-coupling structure. The method further comprises redirecting at least a first part of the multiple reflections by a first group of segments to form a first type image point of the two-dimensional image at a first focal distance. The method further comprises redirecting at least a second part of the multiple reflections by a second group of segments to form a second type image point of the two-dimensional image at a second focal distance.

Optionally, the out-coupling structure is ensuring equal intensity of the redirected multiple of reflections.

Optionally, the intensity-modulated light beam is modulated at least in a first axis and in a second axis.

Optionally, the method further comprises redirecting at least a third part of the multiple reflections to form a third type image point of the two-dimensional image at a third focal distance.

Optionally, the segmented optical structure comprises at least one of selected from a passive transparent optics or an active transparent optics.

The apparatus and the method display the three-dimensional image efficiently by addressing the issue of vergence-accommodation conflict and focal rivalry. The apparatus and the method may be applied in monocular image systems as well as stereoscopic and binocular display systems. Due to presence of the active transparent optics, the apparatus and the method may provide monocular focus cues by generation of multiple focal planes in a controlled manner. Herein, the multiple focal plane generation is implemented using a controlled process, which allows for different modes of operation. The apparatus and the method for displaying the three-dimensional image may be used in a plurality of applications such as, but not limited to, stereoscopic head-mounted displays, smart glasses working on augmented reality and head-up displays.

DETAILED DESCRIPTION OF DRAWINGS

FIG. 1 is a schematic illustration of an apparatus 100 for displaying a three-dimensional image, in accordance with an embodiment of the present disclosure. The apparatus 100 comprises a light source 102, an intensity modulator 104, mirror devices 106A and 106B, a first optics 108, an image waveguide 110 comprising an in-coupling structure 112, an out-coupling structure 114 and a segmented optical structure 116. The intensity modulator 104 is employed to modulate an intensity of a light beam emanating from the light source 102. The mirror devices 106A and 106B may be employed to receive an intensity-modulated light beam 118 and to modulate spatially the intensity-modulated light beam 118 at a given time instant to generate a spatially-modulated light beam comprising three spatially-modulated light rays 120a, 122a and 124a. The first optics 108 is employed to receive the spatially-modulated light beam 120a, 122a and 124a and to collimate the spatially-modulated light beam 120a, 122a and 124a, to generate collimated light beam comprising collimated light rays 120b, 122b and 124b. The in-coupling structure 112 is employed to receive the collimated light beam 120b, 122b and 124b. Herein, the collimated light beam 120b, 122b and 124b corresponds to a given coordinate representing a two-dimensional image information at a given time instant. The out-coupling structure 114 comprises out-coupling sites. Herein, the image waveguide 110 is employed to direct the collimated light beam 120b, 122b and 124b via total internal reflections within the image waveguide 110 from the in-coupling structure 112 to the out-coupling structure 114 to form multiple reflections of the collimated light beam. The out-coupling structure 114 is employed to selectively redirect the multiple reflections via the outcoupling-sites towards the segmented optical structure 116, the multiple reflections representing a coordinate of a two-dimensional image. The segmented optical structure 116 is aligned with the out-coupling structure 114 of the image waveguide 110. The segmented optical structure 116 comprises multiple types of segments, namely a first group of segments 126, a second group of segments 128 and a third type segment 130, corresponding to the outcoupling sites of the out-coupling structure 114. The first group of segments 126 may be employed to redirect at least a first part of the multiple reflections to form a first type image point P1 of the two-dimensional image at a first focal distance (represented by D1). The second group of segments 128 may be employed to redirect at least a second part of the multiple reflections to form a second type image point P2 of the two-dimensional image at a second focal distance (represented by D2). The third group of segments 130 may be employed to redirect at least a third part of the multiple reflections to form a third type image point P3 of the two-dimensional image at a third focal distance (represented by D3). It may be observed that the first focal distance D1 is closest to an eye 138 of a viewer, the second focal distance D2 is in the middle, and the third focal distance D3 is farthest away from the eye 138 of the viewer.

Figure 2:
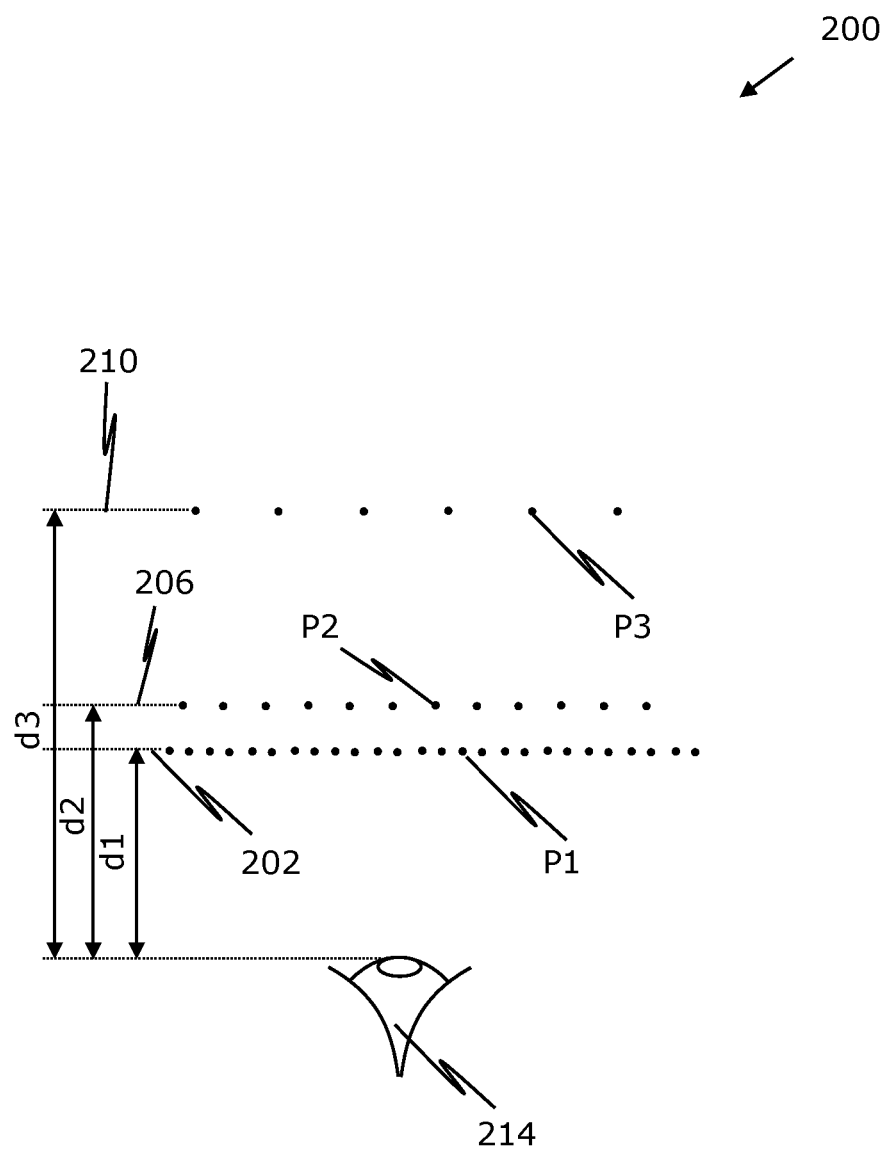
FIG. 2 is a schematic illustration of layout of image points at different focal planes obtained by implementation of a segmented optical structure for the apparatus comprising passive transparent optics, in accordance with an embodiment of the present disclosure.

FIG. 2 is a schematic illustration of a layout 200 of image points at different focal planes obtained by implementation of a segmented optical structure for the apparatus (such as the apparatus 100) comprising passive transparent optics, in accordance with an embodiment of the present disclosure. Herein, the illustrated layout 200 is shown to include three focal planes, namely a first focal plane 202 situated at a first focal distance d1, a second focal plane 206 situated at the second focal distance d2 and a third focal plane 210 situated at the third focal distance d3. As may be seen, the first focal plane 202 is situated closest to the eye 214 and the third focal plane 210 is situated farthest from the eye 214. An exemplary first type image point P1 is displayed at the first focal plane 202, an exemplary second type image point P2 is displayed at the second focal plane 206, and an exemplary third type image point P3 is displayed at the third focal plane 210. A number of image points P1 displayed on the first focal plane 202 is highest and hence, the first focal plane 202 has the highest resolution, and a number of image points P3 displayed on the third focal plane 210 is lowest and hence, the third focal plane 210 has the lowest resolution.

Figure 3A:
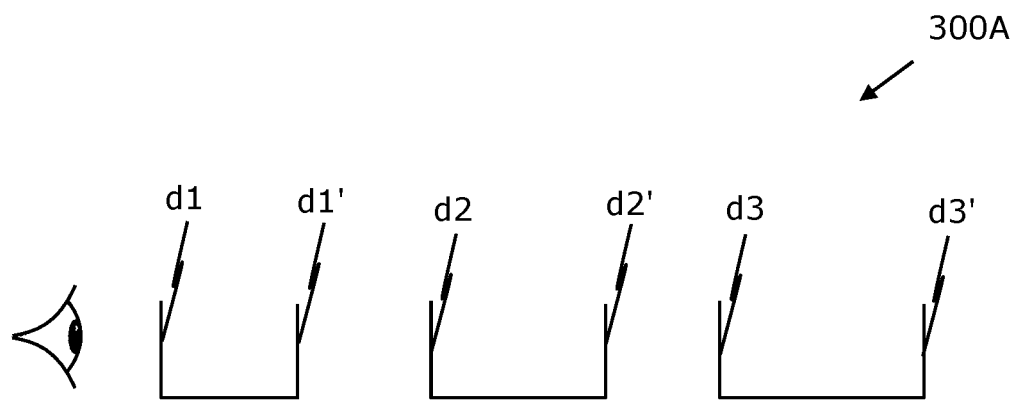
FIGS. 3A-3C are schematic illustrations of different exemplary layouts of image points at different focal planes obtained by implementation of segmented optical structures for the apparatus comprising active transparent optics, in accordance with various embodiments of the present disclosure.
Figure 3B:
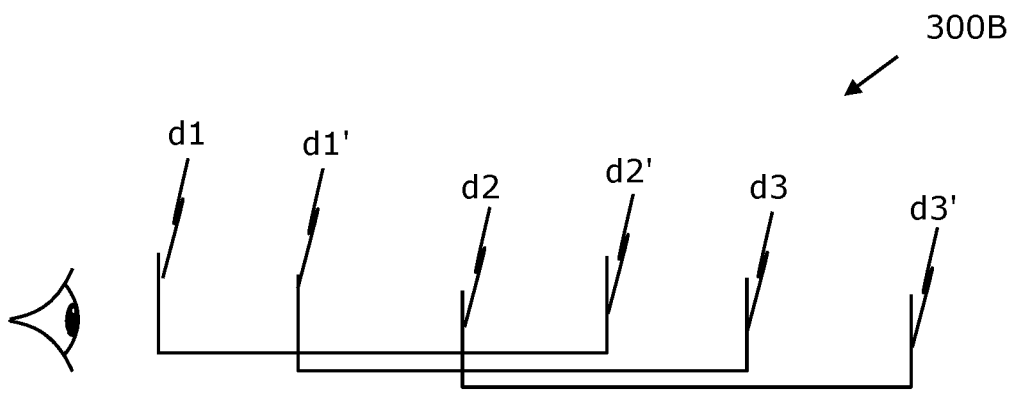
Figure 3C:
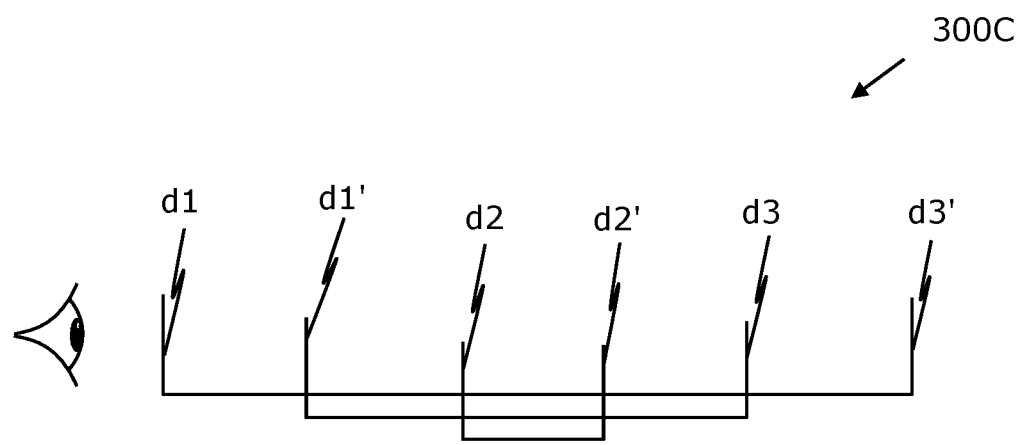

FIGS. 3A-3C are schematic illustrations of different exemplary layouts 300A-300C of image points at different focal planes obtained by implementation of segmented optical structures for the apparatus (such as the apparatus 100) comprising active transparent optics, in accordance with various embodiments of the present disclosure. The exemplary layouts 300A-300C of the image points as obtained using the active transparent optics have multiple switchable focal planes. Herein, the first focal plane may switch between focal distances d1 and d1', the second focal plane may switch between focal distances d2 and d2' and the third focal plane may switch between focal distances d3 and d3'. Referring to FIG. 3A, the illustrated arrangement of the focal planes offers some versatility, but may not be optimal because nearest focal distances are not well represented and hence, increased vergence-accommodation disparity values may be experienced. Referring to FIG. 3B, the illustrated arrangement of the focal planes may be suitable or preferred for augmented reality applications, in which a dominant content may usually be a single three-dimensional object or a scene itself. Referring to FIG. 3C, the illustrated arrangement of the focal planes may be suitable for a scene which involves engaging multiple highly differentiating focal planes. The segmented optical structure may be used for showing three-dimensional images showing a first three-dimensional object very close to the eyes of the viewer and a second three-dimensional object farther away but not near farthest available focal distances. It may be appreciated that the given arrangements of the focal planes in the illustrated layouts 300A-300C may cover most of typical augmented reality scenarios, with most versatile or preferred being the one shown in FIG. 3B.

Figure 4A:
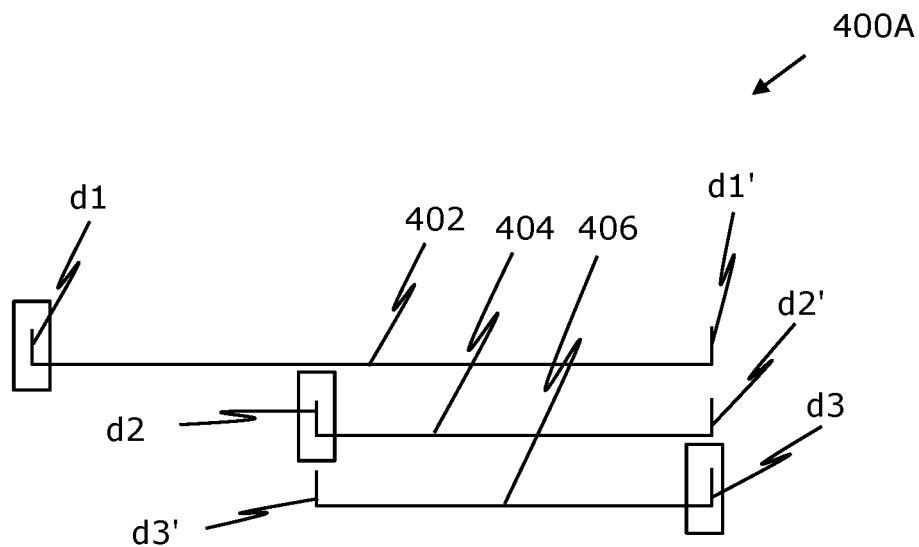
FIGS. 4A-4G are schematic illustrations of different exemplary arrangements of active focal planes achieved by using the segmented optical structures, in accordance with various embodiments of the present disclosure.

FIGS. 4A-4G are schematic illustrations of different exemplary arrangements 400A-400G of active focal planes achieved by using the segmented optical structures, in accordance with various embodiments of the present disclosure. Herein, the first focal plane 402 may switch between focal distances d1 and d1', the second focal plane 404 may switch between focal distances d2 and d2', and the third focal plane 406 may switch between focal distances d3 and d3'. Herein, the focal distance d1 is lesser than the focal distance d1' of the first focal plane 402, the focal distance d2 is lesser than the focal distance d2' of the second focal plane 404, and the focal distance d3 is greater than the focal distance d3' of the third focal plane 406. Further, herein, the focal distance d1' of the first focal plane 402 is equal to the focal distance d2' of the second focal plane 404 and the focal distance d3 of the third focal plane 406; and the focal distance d2 of the second focal plane 404 is equal to the focal distance d3' of the third focal plane 406. In the illustrated examples of FIGS. 4A-4G, the focal planes which are active are shown to be placed in a box. Referring to FIG. 4A, the active focal planes include the first focal plane 402 at the corresponding focal distance d1, the second focal plane 404 at the corresponding focal distance d2 and the third focal plane 406 at the corresponding focal distance d3. The arrangement 400A may be used when some content needs to be represented at the focal distance d1, some need to be represented at the focal distance d2 and some need to be represented at the focal distance d3.

Figure 4B:
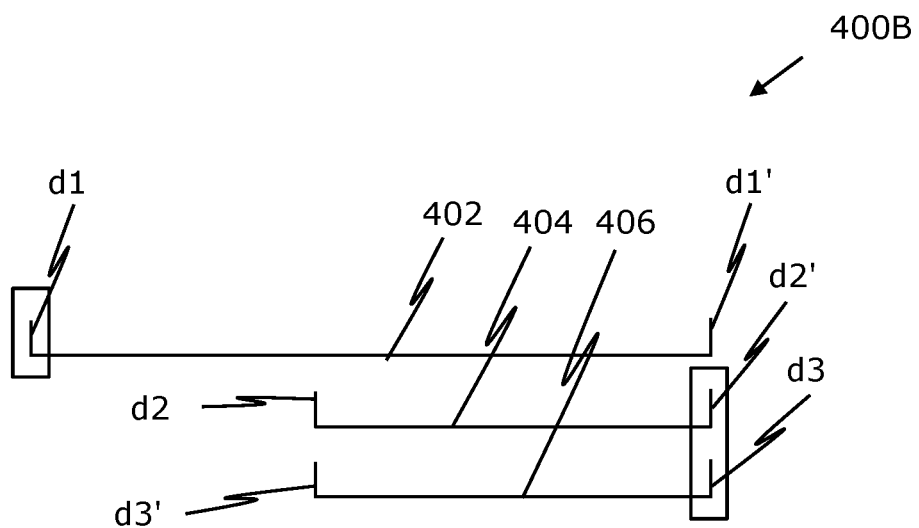

Referring to FIG. 4B, the active focal planes include the first focal plane 402 at the corresponding focal distance d1, the second focal plane 404 at the corresponding focal distance d2' and the third focal plane 406 at the corresponding focal distance d3. The arrangement 400B may be used when some content may be need to be represented at near focal distance and rest of the content of the three-dimensional image need to be represented at far focal distances. This may prevent loss of pixels. It may be noted that if in such case the arrangement 400B is not used, the pixels grouped for the second focal plane 404 may be lost.

Figure 4C:
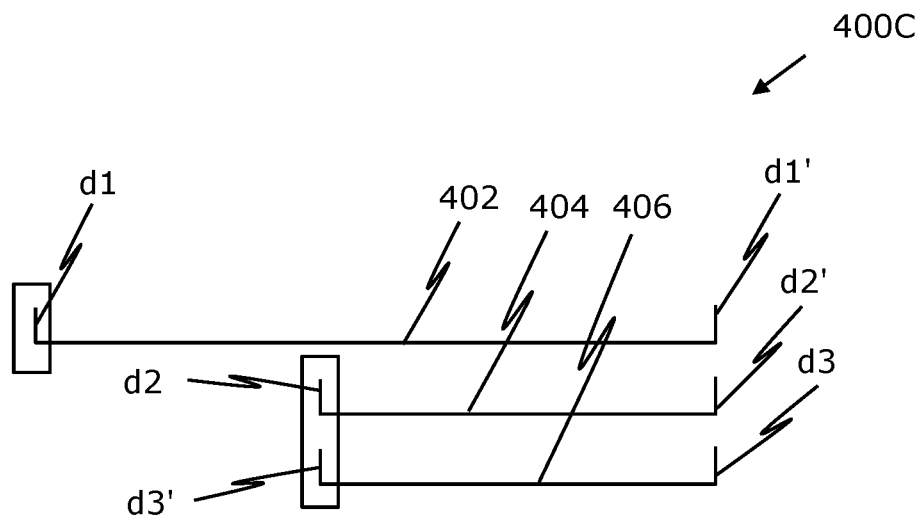

Referring to FIG. 4C, the active focal planes include the first focal plane 402 at the corresponding focal distance d1, the second focal plane 404 at the corresponding focal distance d2 and the third focal plane 406 at the corresponding focal distance d3'. The arrangement 400C may be used when some content may be need to be represented at near focal distance and rest of the content of the three-dimensional image with higher resolution need to be represented at middle focal distances.

Figure 4D:
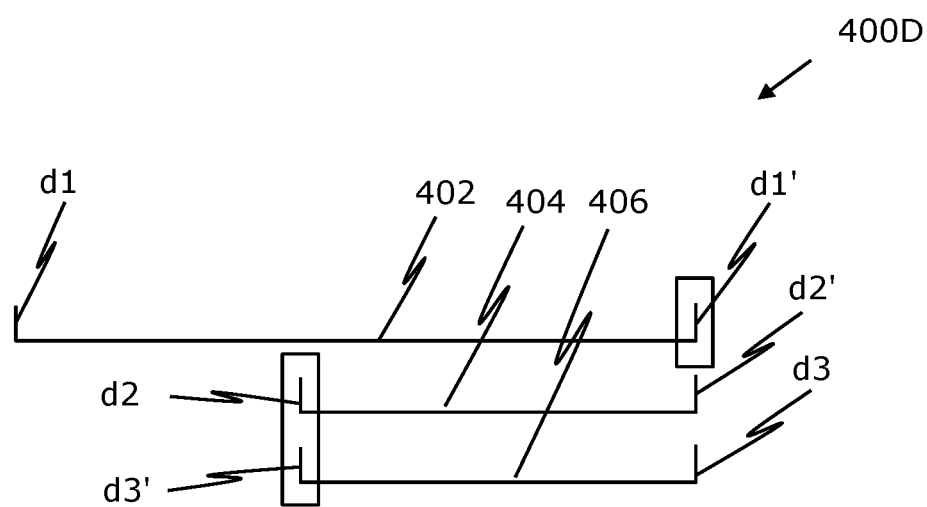

Referring to FIG. 4D, the active focal planes include the first focal plane 402 at the corresponding focal distance d1', the second focal plane 404 at the corresponding focal distance d2 and the third focal plane 406 at the corresponding focal distance d3'. The arrangement 400D may be used when some content may be need to be represented at far focal distance and rest of the content of the three-dimensional image with higher resolution need to be represented at middle focal distances.

Figure 4E:
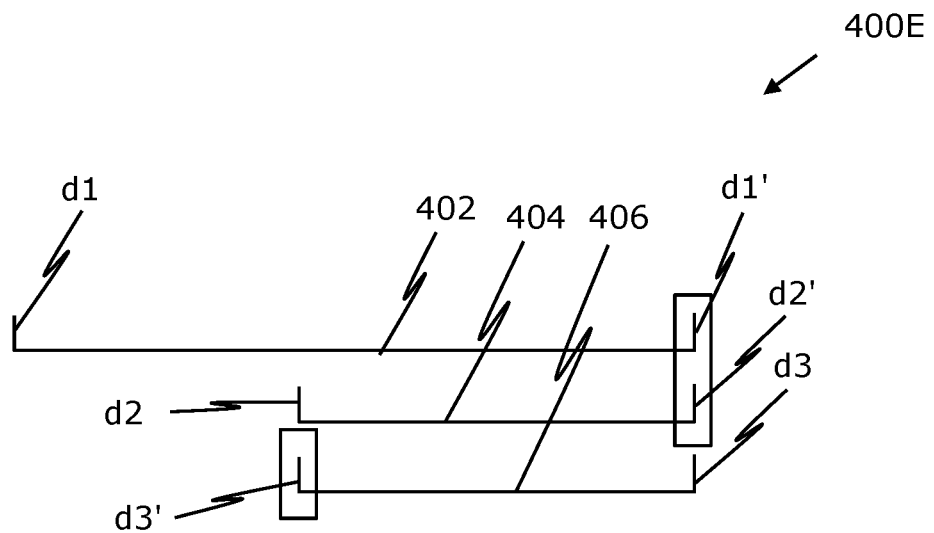

Referring to FIG. 4E, the active focal planes include the first focal plane 402 at the corresponding focal distance d1', the second focal plane 404 at the corresponding focal distance d2' and the third focal plane 406 at the corresponding focal distance d3'. The arrangement 400E may be used when some content with higher resolution may be need to be represented at far focal distance and rest of the content of the three-dimensional image with lower resolution need to be represented at middle near distances.

Figure 4F:
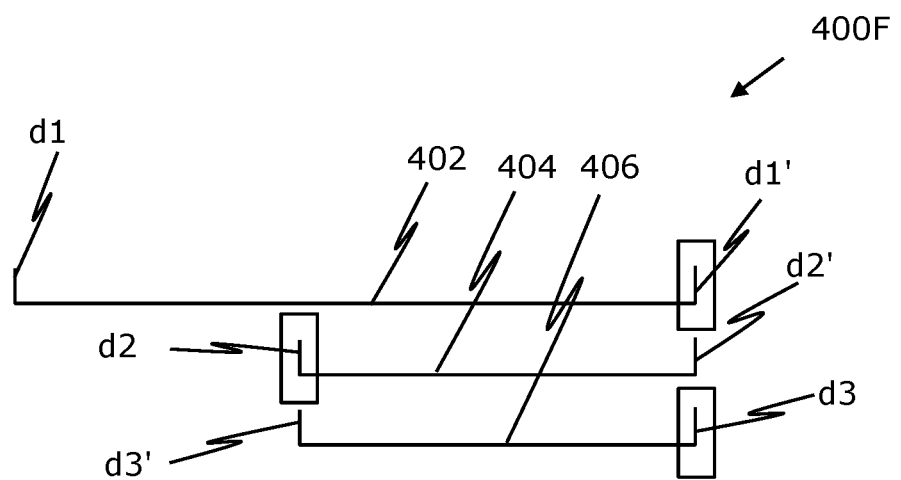

Referring to FIG. 4F, the active focal planes include the first focal plane 402 at the corresponding focal distance d1', the second focal plane 404 at the corresponding focal distance d2 and the third focal plane 406 at the corresponding focal distance d3. The arrangement 400F may be used when some content with comparatively higher resolution may be need to be represented at far focal distance and rest of the content of the three-dimensional image need to be represented at middle focal distances.

Figure 4G:
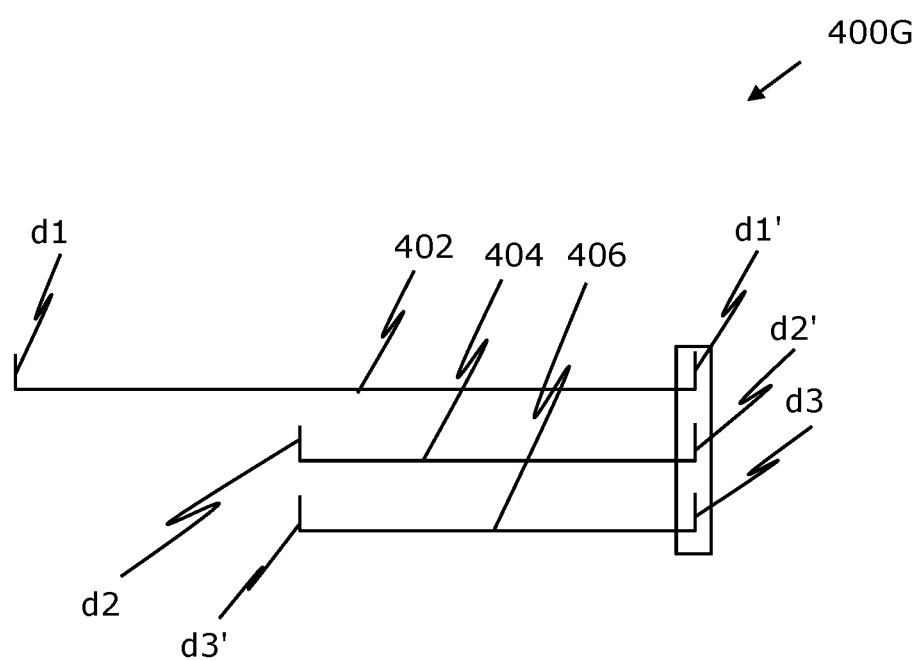

Referring to FIG. 4G, the active focal planes include the first focal plane 402 at the corresponding focal distance d1', the second focal plane 404 at the corresponding focal distance d2' and the third focal plane 406 at the corresponding focal distance d3. The arrangement 400G may be used when all content of the three-dimensional image needs to be displayed at the far focal distances.

Figure 5A:
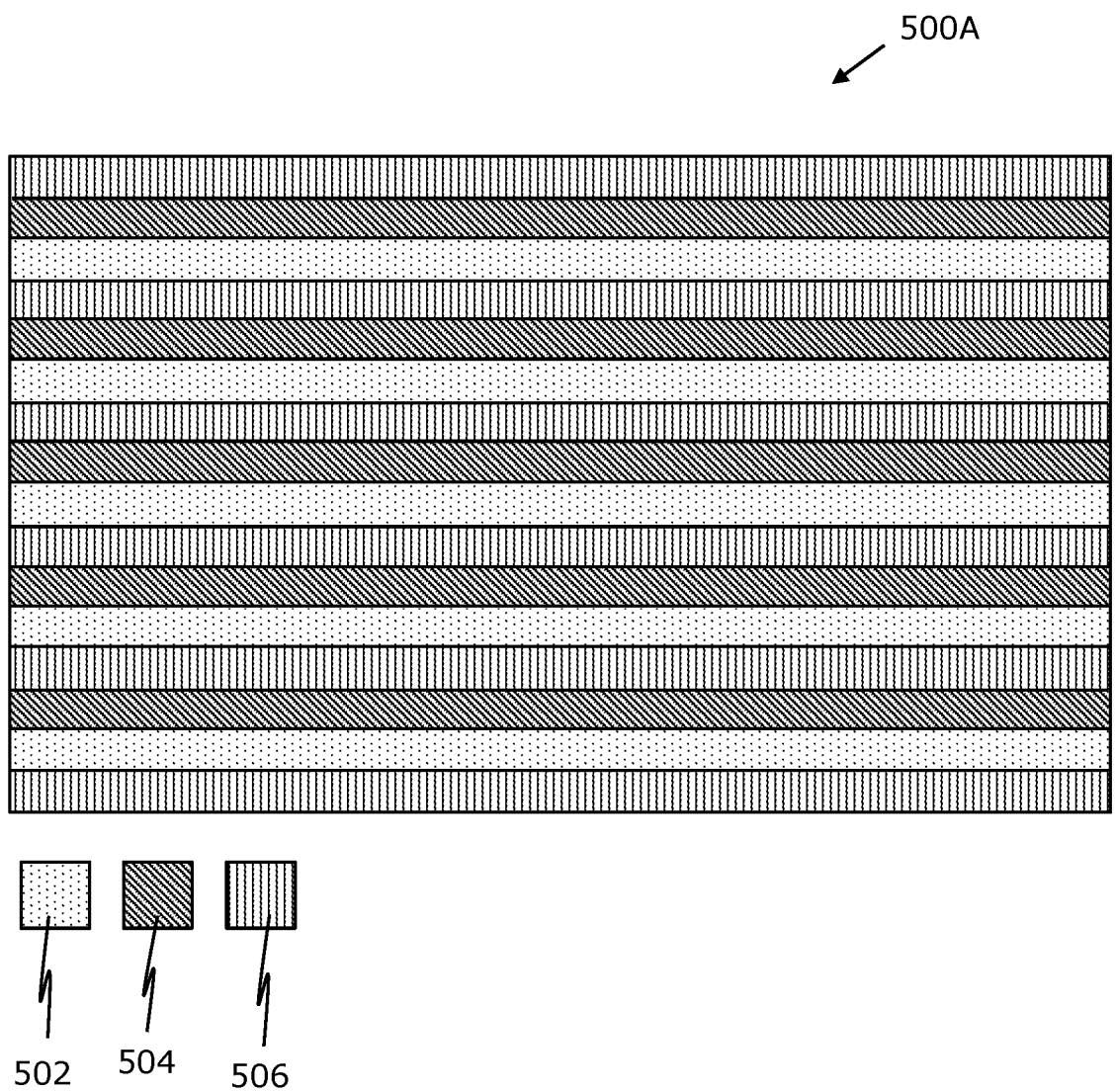
FIGS. 5A-5C are schematic illustrations of different exemplary configurations for allocating image points among different groups corresponding to different focal planes, in accordance with various embodiments of the present disclosure.
Figure 5B:
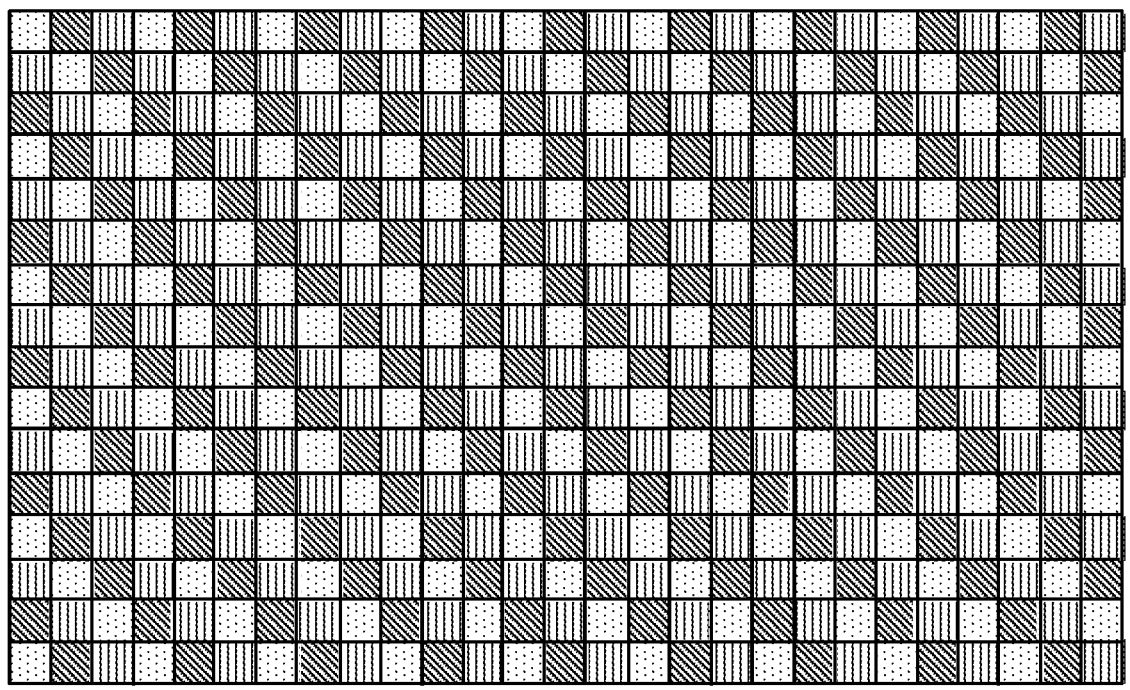
Figure 5B:
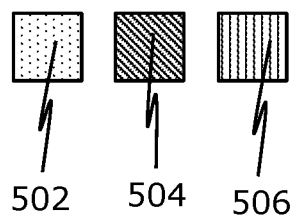
Figure 5C:
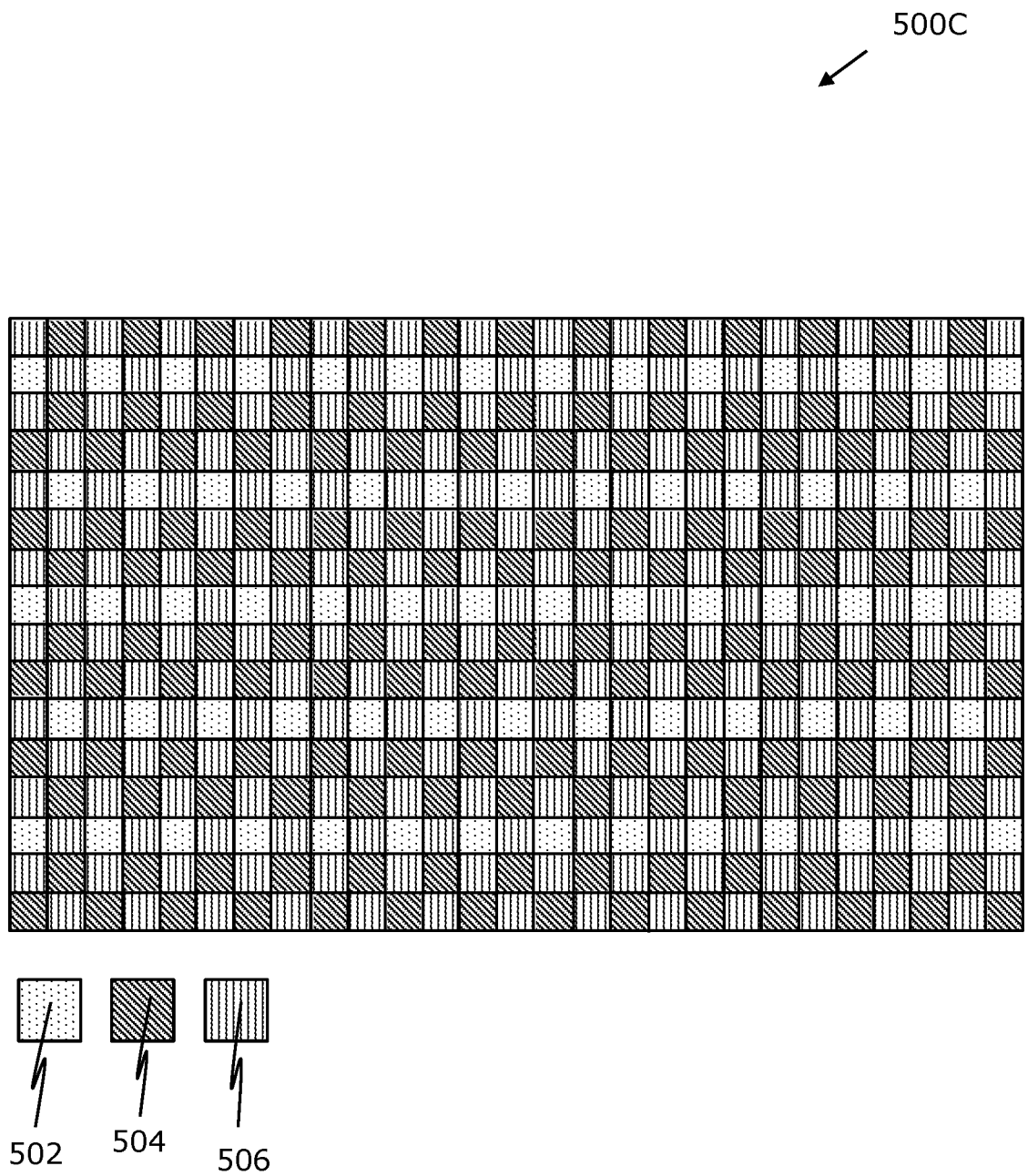

FIGS. 5A-5C are schematic illustrations of different exemplary configurations 500A-500C for allocating image points among different groups corresponding to different focal planes, in accordance with various embodiments of the present disclosure. Herein, image points are grouped into a first group 502, a second group 504 and a third group 506. The image points of the first group 502 correspond to a nearest focal plane which may be the first focal plane (such as the first focal plane 402), the image points of the second group 504 correspond to a middle focal plane which may be the second focal plane (such as the second focal plane 404) and the image points of the third group 506 correspond to a farthest focal plane which may be the third focal plane (such as the third focal plane 406). It may be noted that in case of active transparent optics, the first group 502, the second group 504 and the third group 506 could be switched between at least two focal distances. Referring to FIG. 5A, the illustrated configuration 500A equally allocates the image points into the first group 502, the second group 504 and the third group 506, and the groups 502, 504 and 506 are arranged as lines to be rendered. Referring to FIG. 5B, the illustrated configuration 500B equally allocates the image points into the first group 502, the second group 504 and the third group 506, and the groups 502, 504 and 506 are arranged as uniformly distributed blocks, with the total count of image points of each of the groups 502, 504 and 506 being equal, to be rendered. Referring to FIG. 5C, the illustrated configuration 500C allocates the image points into the first group 502, the second group 504 and the third group 506, and the groups 502, 504 and 506 are arranged as non-uniformly distributed blocks, to be rendered. Herein, the first group 502 has largest number of image points, the second group 504 has lesser number of image points as compared to the first group 502 and the third group 506 has the least number of image points.

Figure 6:
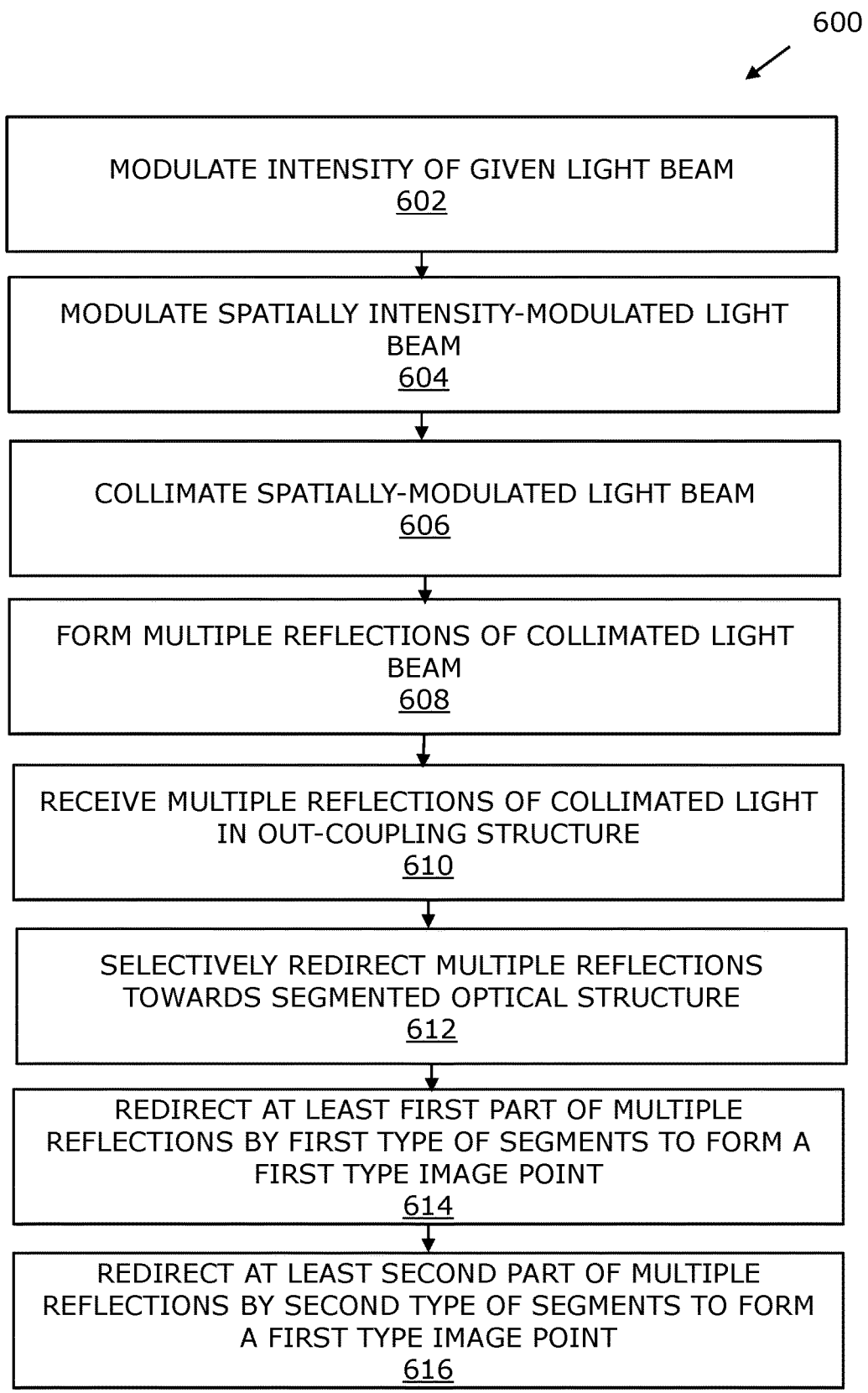
FIG. 6 is a flowchart of a method for displaying the three-dimensional image, in accordance with an embodiment of the present disclosure.

FIG. 6 is a flowchart 600 of a method for displaying the three-dimensional image, in accordance with an embodiment of the present disclosure. The method comprises, at step 602, modulating intensity of the given light beam. Herein, the intensity of the given light beam emanating from the light source may be modulated via the intensity modulator and the intensity-modulated light beam may be directed towards the mirror device. The method comprises, at step 604, modulating spatially the intensity-modulated light. Herein, the intensity-modulated light beam may be modulated spatially via the mirror device at the given time instant, and the spatially-modulated light beam may be directed towards the collimator. The method comprises, at step 606, collimating the spatially-modulated light beam. Herein, the spatially-modulated light beam may be collimated via the first optics and the collimated light beam may be directed towards the in-coupling structure of the image waveguide. The collimated light beam corresponds to the given coordinate representing the two-dimensional image information. The method comprises, at step 608, forming multiple reflections of the collimated light beam. Herein, the multiple reflections of the collimated light beam may be formed by undergoing total internal reflections inside the image waveguide of the collimated light beam. The method comprises, at step 610, receiving multiple reflections of the collimated light beam in the out-coupling structure of the image waveguide. Herein, the out-coupling structure comprises out-coupling sites. The method comprises, at step 612, selectively redirecting the multiple reflections towards the segmented optical structure. Herein, the multiple reflections may be selectively redirected via the outcoupling-sites towards the segmented optical structure aligned with the out-coupling structure of the image waveguide. The multiple reflections represent the coordinate of the two-dimensional image and the segmented optical structure comprises at least two types of segments corresponding to the outcoupling sites of the out-coupling structure. The method comprises, at step 614, redirecting at least the first part of the multiple reflections by the first type of segments to form the first type image point of the two-dimensional image at the first focal distance. The method comprises, at step 616, redirecting at least the second part of the multiple reflections by the second type of segments to form the second type image point of the two-dimensional image at the second focal distance.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. An apparatus for displaying a three-dimensional image, the apparatus comprising
    a light source;
    an intensity modulator employed to modulate the intensity of a given light beam emanating from the light source;
    a mirror device employed to receive an intensity-modulated light beam and to modulate spatially the intensity-modulated light beam at a given time instant;
    a first optics employed to receive the spatially-modulated light beam and to collimate the spatially-modulated light beam;
    an image waveguide comprising
        an in-coupling structure employed to receive the collimated light beam, wherein the collimated light beam corresponds to a given coordinate representing a two-dimensional image information at a given time instant,
        an out-coupling structure comprising out-coupling sites,
        wherein the image waveguide is employed to direct the collimated light beam via total internal reflections within the image waveguide from the in-coupling structure to the out-coupling structure to form multiple reflections of the collimated light beam, and
        wherein the out-coupling structure is interposed between a surface of the image waveguide and a segmented optical structure and is employed to selectively redirect the multiple reflections via the outcoupling-sites towards the segmented optical structure, the multiple reflections representing a coordinate of a two-dimensional image;
    the segmented optical structure aligned with the out-coupling structure of the image waveguide, the segmented optical structure comprising segments comprising active transparent objects corresponding to the outcoupling sites of the out-coupling structure,
    wherein the segments comprise at least two groups of segments:
        a first group of segments comprising the active transparent objects employed to redirect at least a first part of the multiple reflections to switch a first type image point P1 of the two-dimensional image between two first focal distances d1, d1', and
        a second group of segments comprising the active transparent objects employed to redirect at least a second part of the multiple reflections to form a second type image point P2 of the two-dimensional image between two second focal distances d2, d2'.

2. The apparatus according to claim 1, wherein the first optics is a collimator.

3. The apparatus according to claim 1, wherein the out-coupling structure is employed to ensure equal intensity of the redirected multiple reflections.

4. The apparatus according to claim 1, wherein the mirror device comprises at least one selected from two 1-dimensional mirrors or a 2-dimensional mirror.

5. The apparatus according to claim 1, wherein the mirror device is further employed to modulate the light beam at least in a first axis and in a second axis.

6. The apparatus according to claim 1, wherein the mirror device is a micro-electromechanical mirror system.

7. The apparatus according to claim 1, wherein the light source is a laser light source and the light beam is a laser light beam having a wavelength visible to human spectrum.

8. The apparatus according to claim 1, wherein at least one of the in-coupling structure and the out-coupling structure is selected to be at least one of a diffractive optical element, a holographic optical element, a metasurface, an array of microprisms, a volume holographic optical element, a surface diffractive grating, a structure with at least one prism element.

9. The apparatus according to claim 1 further comprising a third group of segments employed to redirect at least a third part of the multiple reflections to form a third type image point P3 of the two-dimensional image at a third focal distance d3.

10. The apparatus according to claim 1, wherein the segmented optical structure comprises at least one selected from passive transparent optics or active transparent optics.

11. A method for displaying a three-dimensional image, the method comprising modulating, via an intensity modulator, an intensity of a given light beam emanating from the light source, and directing the intensity-modulated light beam towards a mirror device;

modulating spatially, via the mirror device, the intensity-modulated light beam at a given time instant, and directing the spatially-modulated light beam towards a collimator;

collimating the spatially-modulated light beam via a first optics, and directing the collimated light beam towards an in-coupling structure of an image waveguide, wherein the collimated light beam corresponds to a given coordinate representing the two-dimensional image information;

forming multiple reflections of the collimated light beam by undergoing total internal reflections inside the image waveguide of the collimated light beam;

receiving multiple reflections of the collimated light beam in an out-coupling structure of the image waveguide interposed between a surface of the image waveguide and a segmented optical structure, wherein the out-coupling structure comprises out-coupling sites;

selectively redirecting the multiple reflections via the outcoupling-sites towards the segmented optical structure aligned with the out-coupling structure of the image waveguide, the multiple reflections representing a coordinate of a two-dimensional image, and wherein the segmented optical structure comprises at least two types of segments comprising active transparent objects, the at least two types of segments corresponding to the outcoupling sites of the out-coupling structure;

redirecting at least a first part of the multiple reflections by a first group of segments comprising the active transparent objects to switch a first type image point P1 of the two-dimensional image between two first focal distances d1, d1'; and redirecting at least a second part of the multiple reflections by a second group of segments comprising the active transparent objects to switch a second type image point P2 of the two-dimensional image between two second focal distances d2, d2'.

12. The method according to claim 11, wherein the out-coupling structure is ensuring equal intensity of the redirected multiple reflections.

13. The method according to claim 11, wherein the intensity-modulated light beam is modulated at least in a first axis and in a second axis.

14. The method according to claim 11 further comprising redirecting at least a third part of the multiple reflections to form a third type image point P3 of the two-dimensional image at a third focal distance d3.

15. The method according to claim 11, wherein the segmented optical structure comprises at least one of selected from a passive transparent optics or an active transparent optics.

\* \* \* \* \*